(12) United States Patent
Tsujikawa (10) Patent No.: US 10,921,684 B2
(45) Date of Patent: Feb. 16, 2021

(54) IMAGING APPARATUS (71) Applicant: FUJITSU FRONTECH LIMITED, Tokyo (JP)

(72) Inventor: Akinori Tsujikawa, Inagi (JP)

(73) Assignee: FUJITSU FRONTECH LIMITED, Inagi (JP)

(*) Notice: Subject to any disclaimer, the term of this patent is extended or adjusted under 35 U.S.C. 154(b) by 0 days.

(21) Appl. No.: 16/201,456

(22) Filed: Nov. 27, 2018

(65) Prior Publication Data
US 2019/0094657 A1 Mar. 28, 2019

Related U.S. Application Data (63) Continuation of application No. PCT/JP2016/067421, filed on Jun. 10, 2016.

(51) Int. Cl.
| | |
|---|---|
| *G03B 15/03* | (2006.01) |
| *G02B 7/32* | (2021.01) |
| *G03B 15/02* | (2021.01) |
| *G03B 17/02* | (2021.01) |
| *G02B 7/28* | (2021.01) |
| *G02B 7/02* | (2021.01) |
| *G01S 7/481* | (2006.01) |

(Continued)

(52) U.S. Cl.
CPC ............ G03B 15/03 (2013.01); G01S 7/4816 (2013.01); G02B 7/022 (2013.01); G02B 7/025 (2013.01); G02B 7/28 (2013.01); G02B 7/32 (2013.01); G03B 15/02 (2013.01); G03B 17/02 (2013.01); H04N 5/2256 (2013.01); G06K 9/00885 (2013.01); G06K 2009/00932 (2013.01)

(58) Field of Classification Search
CPC ............................. G03B 15/03; G01S 7/4816
See application file for complete search history.

(56) References Cited

U.S. PATENT DOCUMENTS

| | | | |
|---|---|---|---|
| 4,281,895 A | * | 8/1981 | Mohr .................... G02B 7/007 359/827 |
| 6,147,817 A | | 11/2000 | Hashizume |
| 2001/0022725 A1 | | 9/2001 | Kobayashi et al. |

(Continued)

FOREIGN PATENT DOCUMENTS

| | | |
|---|---|---|
| CN | 101030013 A | 9/2007 |
| CN | 103792638 A | 5/2014 |

(Continued)

OTHER PUBLICATIONS

Written Opinion of the International Searching Authority of PCT/JP2016/067421, dated Sep. 6, 2016.

(Continued)

*Primary Examiner* — Clayton E. LaBalle
*Assistant Examiner* — Dennis Hancock
(74) *Attorney, Agent, or Firm* — Greer Burns & Crain Ltd.

(57) ABSTRACT

An imaging apparatus includes a ranging light source, an aperture that includes a through hole through which light emitted from the ranging light source passes, and a ranging lens disposed on an optical path of the light emitted from the ranging light source, wherein the aperture includes a plurality of press-fit convex parts projecting in a direction opposite to the ranging light source, and the ranging lens is press-fitted into a region surrounded by the plurality of press-fit convex parts.

2 Claims, 10 Drawing Sheets

(51) Int. Cl.
*H04N 5/225* (2006.01)
*G06K 9/00* (2006.01)

(56) References Cited

U.S. PATENT DOCUMENTS

| | | | |
|---|---|---|---|
| 2004/0079871 | A1 | 4/2004 | Oikawa et al. |
| 2006/0109668 | A1 | 5/2006 | Schmieder et al. |
| 2007/0206391 | A1 | 9/2007 | Matsuo et al. |
| 2007/0216797 | A1 | 9/2007 | Yoshida et al. |
| 2011/0317286 | A1* | 12/2011 | Drost ............... G03B 3/02 359/798 |
| 2012/0047788 | A1 | 3/2012 | Capson |
| 2013/0004152 | A1* | 1/2013 | Imafuji ............ G03B 15/05 396/155 |
| 2014/0118727 | A1 | 5/2014 | Murata et al. |
| 2016/0223398 | A1 | 8/2016 | Murata et al. |

FOREIGN PATENT DOCUMENTS

| | | | |
|---|---|---|---|
| EP | 1429168 | A2 | 6/2004 |
| EP | 1670240 | A1 | 6/2006 |
| EP | 1830304 | A1 | 9/2007 |
| EP | 2728378 | A1 | 5/2014 |
| JP | 61278808 | A | 12/1986 |
| JP | 63155113 | U | 10/1988 |
| JP | 08112940 | A | 5/1996 |
| JP | 08313778 | A | 11/1996 |
| JP | 10062159 | A | 3/1998 |
| JP | 10186196 | A | 7/1998 |
| JP | 10311944 | A | 11/1998 |
| JP | 11174282 | A | 7/1999 |
| JP | 2000314836 | A | 11/2000 |
| JP | 2004071366 | A | 3/2004 |
| JP | 2005084554 | A | 3/2005 |
| JP | 2007235872 | A | 9/2007 |
| JP | 2010276979 | A | 12/2010 |
| JP | 2011018081 | A | 1/2011 |
| JP | 47008220 | B2 | 6/2011 |
| JP | 2014090099 | A | 5/2014 |

OTHER PUBLICATIONS

Int'l. Search Report issued in Int'l. Application No. PCT/JP2016/067421, dated Sep. 6, 2016.
EESR issued in corresponding EP patent applicaiton No. 16904682.8, dated Apr. 23, 2019.
Office action issued in corresponding Japanese patent application No. 2018-522291, dated Aug. 6, 2019 (with full machine translation).
Decision of Dismissal of Amendment issued in corresponding JP patent application No. 2018-522291, issued May 26, 2020 (with full machine translation).
Decision of Refusal issued in corresponding JP patent application No. 2018-522291, issued May 25, 2020 (with full machine translation).
Office action issued in corresponding Japanese patent application No. 2018-522291, dated Jan. 14, 2020 (full machine translation).
Office action issued for CN201680086193.4, dated Jul. 2, 2020.
Office action issued in EP16904682.8, dated Jul. 23, 2020.

* cited by examiner

PRIOR ART

F I G. 9

PRIOR ART

FIG. 10

IMAGING APPARATUS

CROSS-REFERENCE TO RELATED APPLICATION

This application is continuation application of International Application PCT/JP2016/067421 filed on Jun. 10, 2016 and designated the U.S., the entire contents of which are incorporated herein by reference.

TECHNICAL FIELD

The embodiments discussed herein are related to an imaging apparatus.

BACKGROUND ART

Conventionally, an imaging apparatus that includes an imaging element disposed on a wiring board and a lens unit that focuses light on the imaging element has been used for a biometrics authentication apparatus that performs authentication based on biological information such as palm or finger veins, fingerprints, or pupil irises. As such an imaging apparatus, a known imaging apparatus further includes a ranging light source for measuring a distance to a subject and an aperture for blocking diffusion of light emitted from the ranging light source (see, for example, Japanese Patent No. 4708220).

SUMMARY OF THE INVENTION

A disclosed imaging apparatus includes a ranging light source, an aperture that includes a through hole through which light emitted from the ranging light source passes, and a ranging lens disposed on an optical path of the light emitted from the ranging light source, wherein the aperture includes a plurality of press-fit convex parts projecting in a direction opposite to the ranging light source, and the ranging lens is press-fitted into a region surrounded by the plurality of press-fit convex parts.

EMBODIMENTS

As a technique related to an aperture provided at an imaging apparatus as described above, descriptions will be given of a configuration for distance measurement in accordance with a reference technique relying on an aperture 111 depicted in FIGS. 9 and 10.

Figure 9:
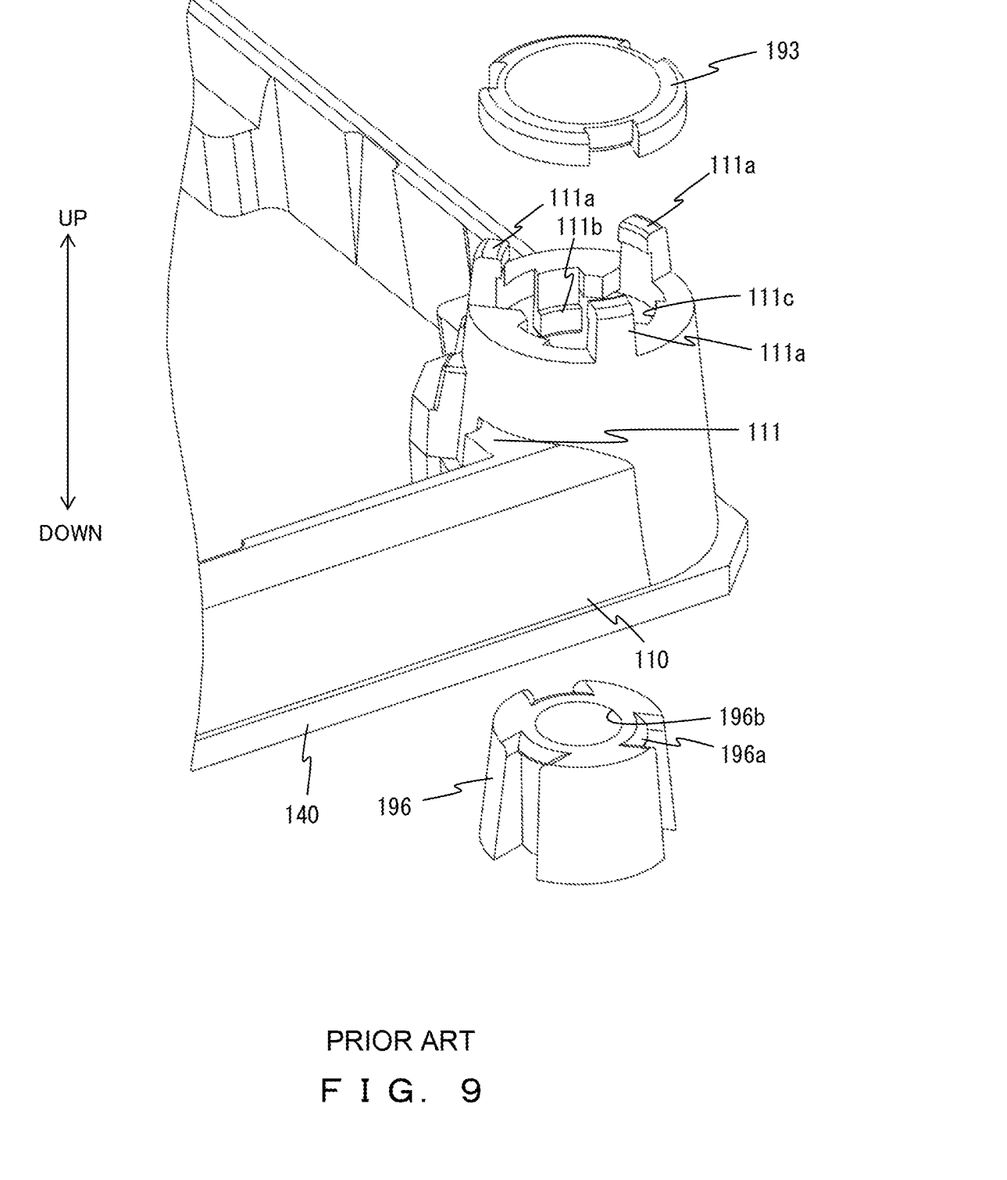
FIG. 9 is an exploded perspective view illustrating a configuration for distance measurement in accordance with a reference technique.
Figure 10:
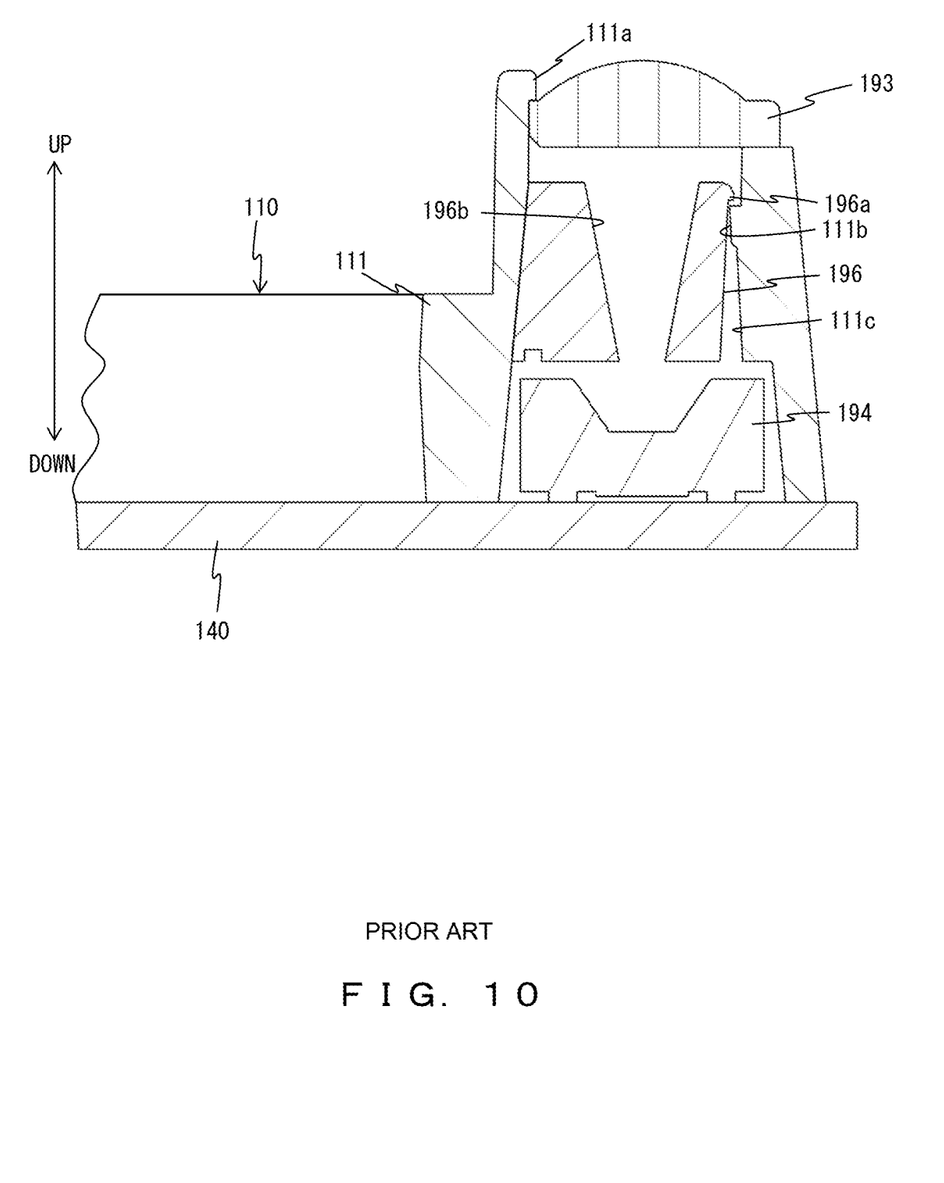
FIG. 10 is a cross-sectional view illustrating a configuration for distance measurement in accordance with a reference technique.

FIGS. 9 and 10 are an exploded perspective view and a cross-sectional view illustrating a configuration for distance measurement in accordance with a reference technique.

The aperture 111 depicted in FIG. 9 is provided at each of four corners of a framing member 110 having a rectangular frame shape (rectangular hollow shape) provided on the outer edge of a wiring board 140, and the aperture 111 and the framing member 110 are separate components.

As depicted in FIGS. 9 and 10, the aperture 111 includes three lugs 111a projecting upward to lock a ranging lens 193. The aperture 111 also includes a through hole 111c. Before the framing member 110 and the aperture 111 are fixed to the wiring board 140, a cylindrical hole part 196 is inserted from below into the through hole 111c.

A lug 196a provided at an upper edge portion of the hole part 196 engages a lug 111b provided within the trough hole 111c. As depicted in FIG. 10, the hole part 196 includes a through hole 196b through which light emitted upward from a ranging light emitter 194 passes, and the diameter of the through hole 196b gradually increases towards the upper side.

As described above, the hole part 196 and the aperture 111 are separate components. This is because it is impossible to provide, due to the presence of the lugs 111a provided at the aperture 111, a through hole having a diameter that gradually increases as the distance from the ranging light emitter 194 increases, such as the through hole 196b in the hole part 196, in terms of die cutting in molding.

The hole part 196 is disposed within the aperture 111 in the configuration depicted in FIGS. 9 and 10, and this results in a larger parts count and more man hours for assembling than in a situation in which the hole part 196 is not disposed in the aperture 111. Moreover, if the imaging apparatus has been subject to a dropping impact or the like, misalignments will occur between the positions of the central axes of the ranging lens 193 and the hole part 196 and between the positions of the central axes of the hole part 196 and the aperture 111. Such positional misalignments decrease the quantity of light emitted from the ranging lens 193.

The following describes an imaging apparatus 1 in accordance with an embodiment by referring to the drawings.

The imaging apparatus 1 emits light to a subject (e.g., a palm) and receives, at an imaging element 91, the light reflected from the subject so as to capture an image. The imaging element 91 is, for example, an image sensor.

Figure 1:
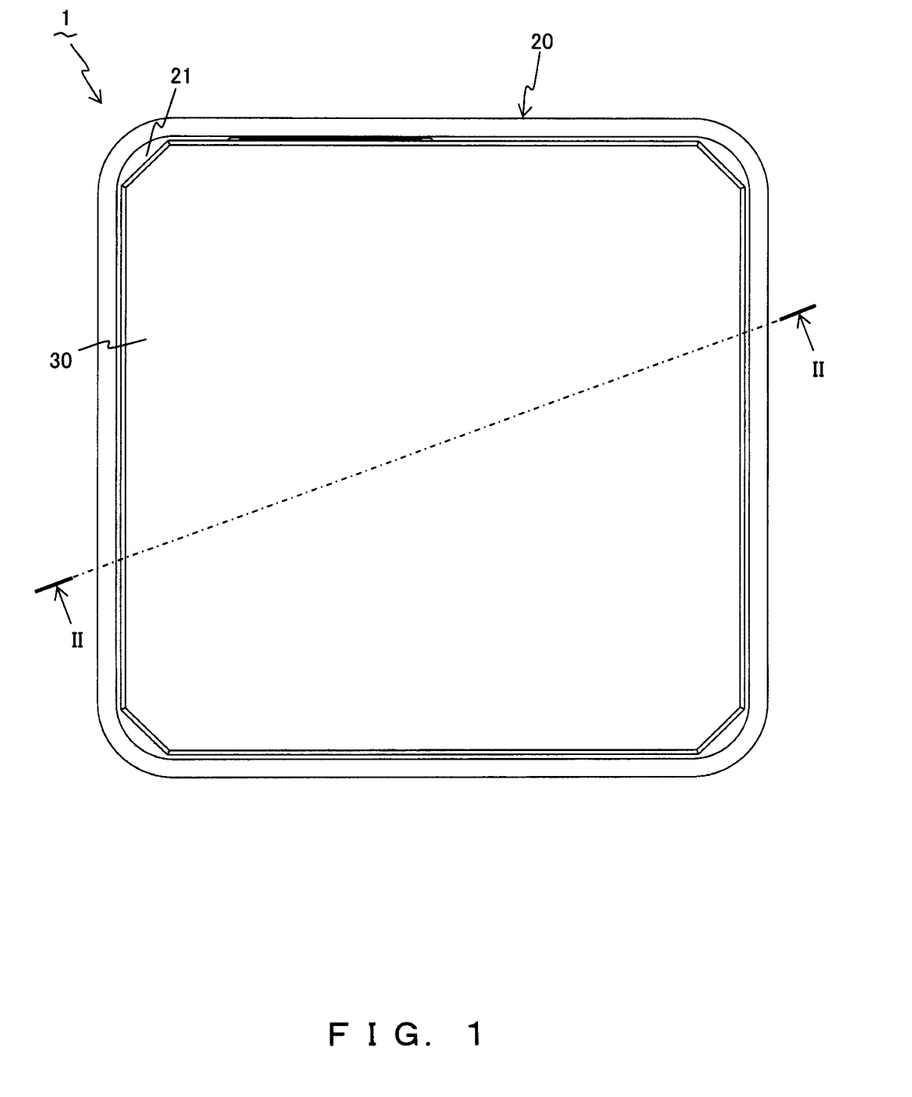
FIG. 1 is a plane view illustrating an imaging apparatus in accordance with an embodiment.

FIG. 1 is a plane view illustrating an imaging apparatus 1.

Figure 2:
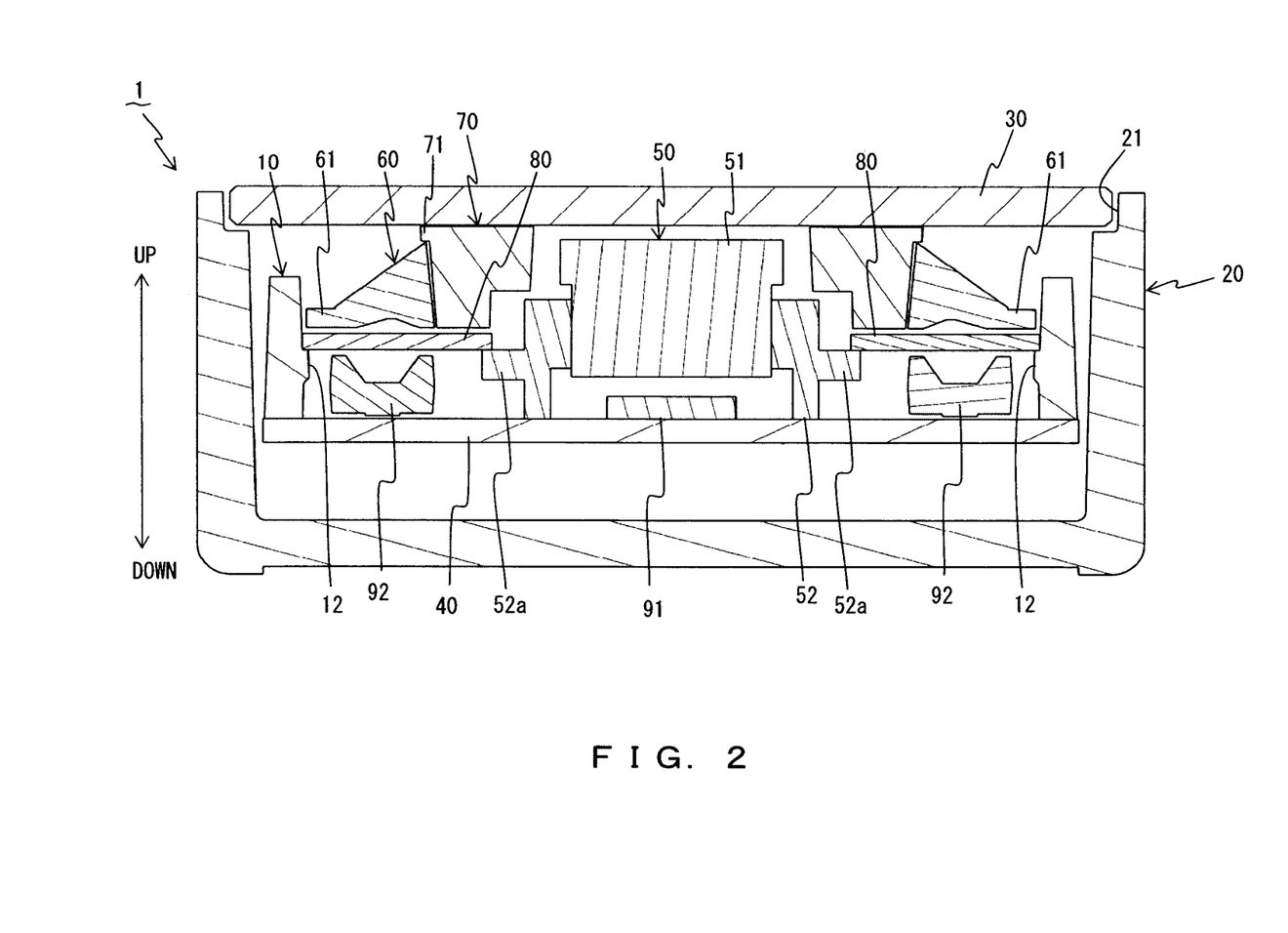
FIG. 2 is a cross-sectional view taken on line II-II of FIG. 1.

FIG. 2 is a cross-sectional view taken on line II-II of FIG. 1.

Figure 3:
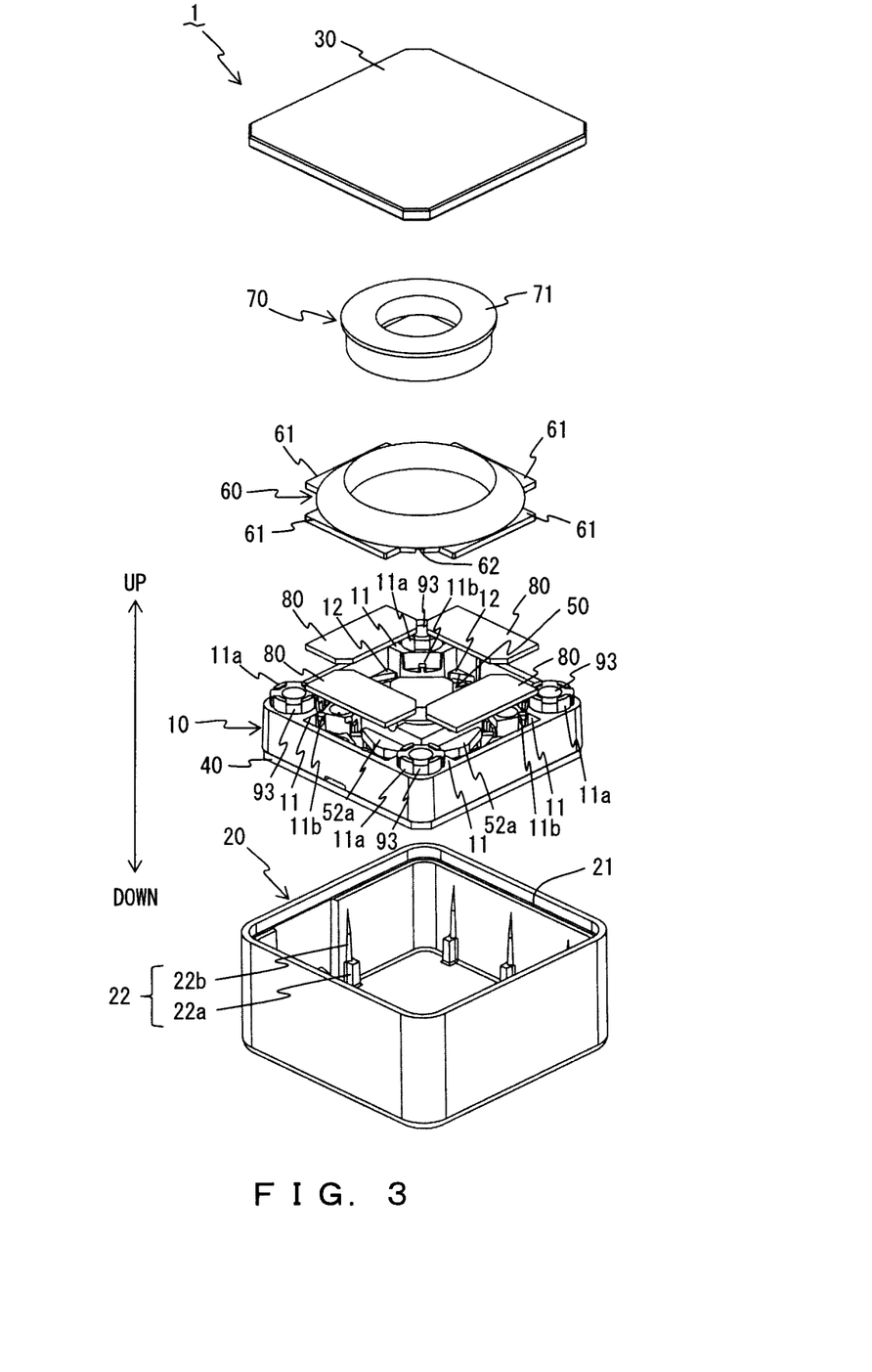
FIG. 3 is an exploded perspective view illustrating an imaging apparatus in accordance with an embodiment.

FIG. 3 is an exploded perspective view illustrating the imaging apparatus 1.

Figure 6:
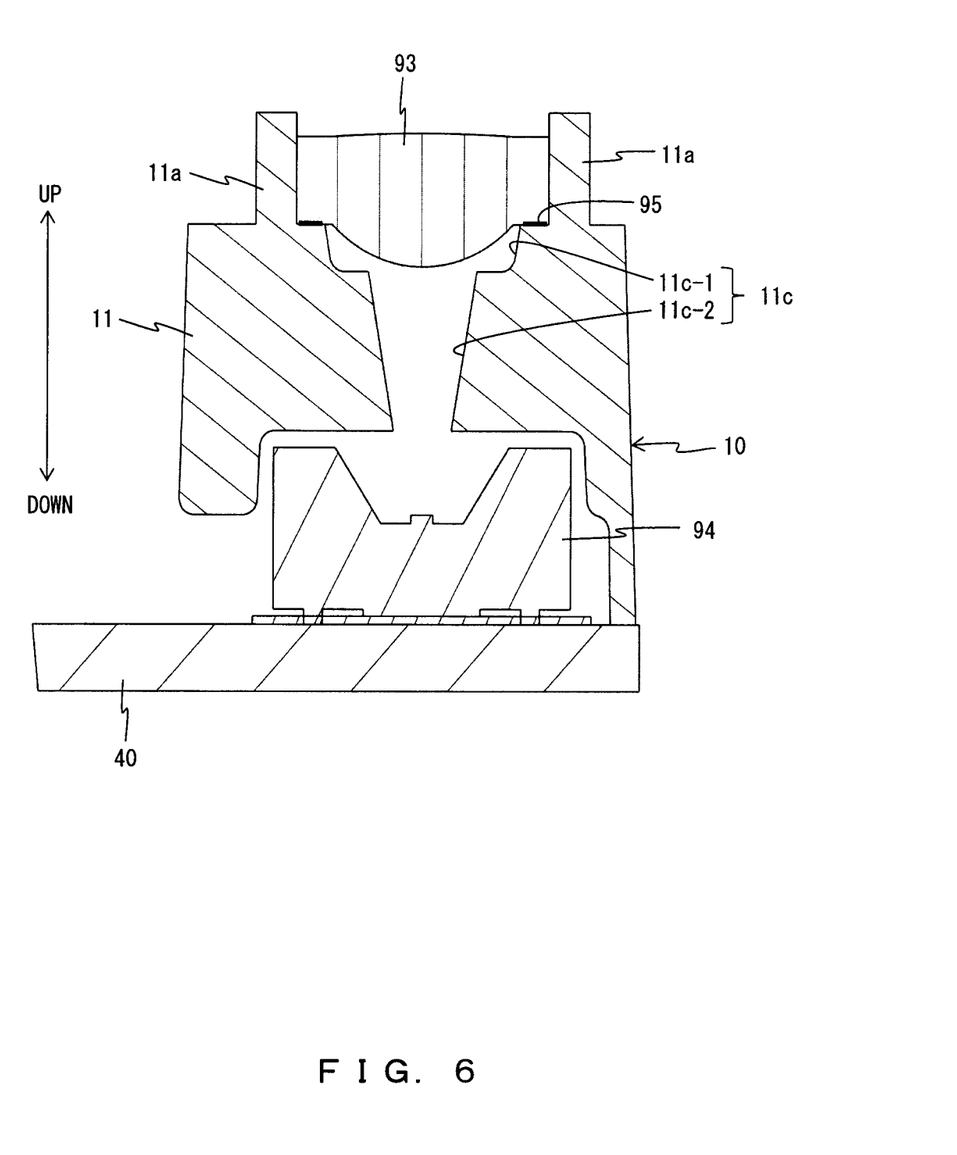
FIG. 6 is a cross-sectional view taken on line VI-VI of FIG. 5.
Figure 7:
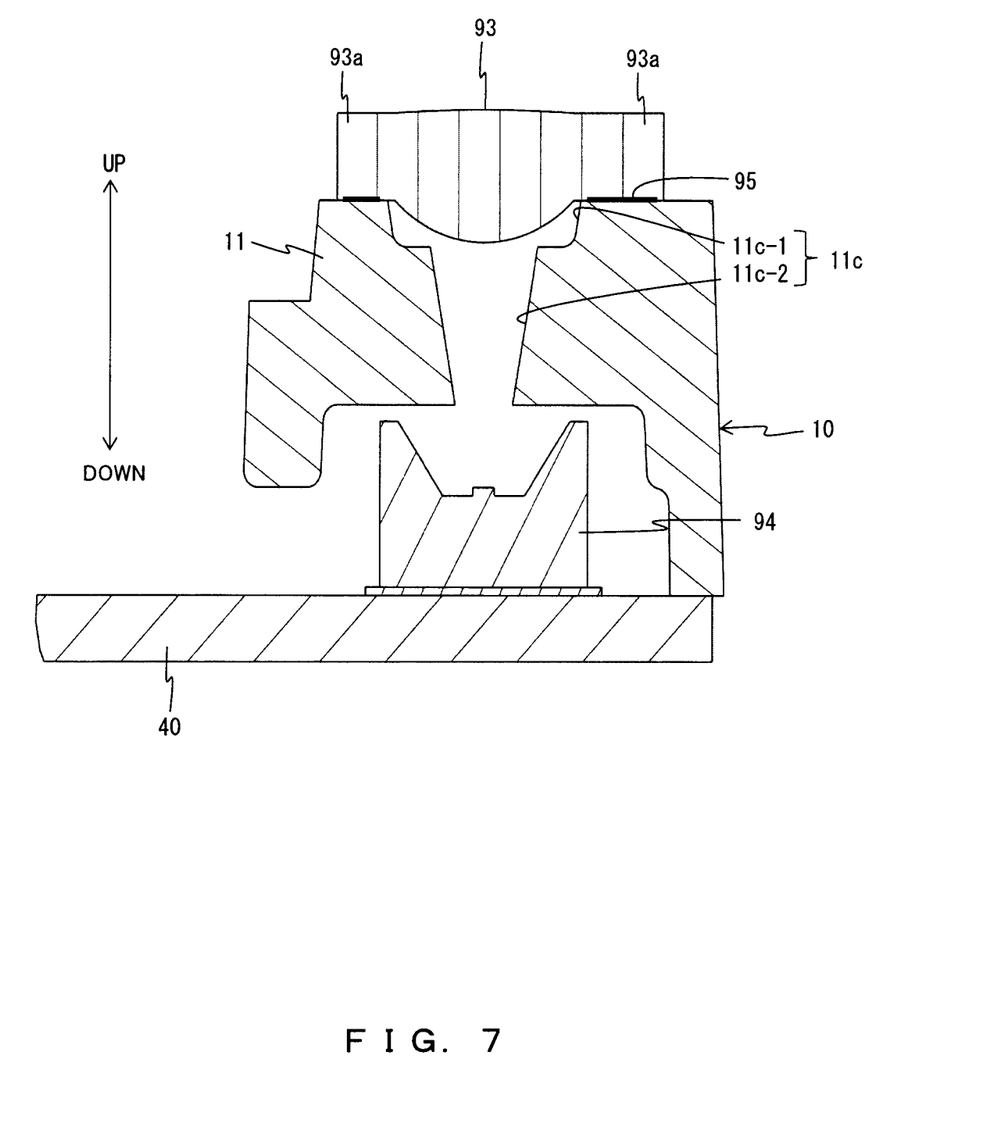
FIG. 7 is a cross-sectional view taken on line VII-VII of FIG. 5.

As depicted in FIGS. 2 and 3, the imaging apparatus 1 includes an aperture 10, a housing 20, a top cover 30, a wiring board 40, a lens unit 50, a light guide body 60, a light shield body 70, four polarization members 80, an imaging element 91, eight illumination light emitters 92 (see FIG. 4), and four ranging lenses 93 (see FIG. 3). As depicted in FIGS. 6 and 7, the imaging apparatus 1 further includes four (a plurality of) ranging light emitters 94 that are exemplary ranging light sources, and four double-sided tapes 95. The ranging light source emits light to measure a distance to a subject.

The imaging apparatus 1 is used as a biometrics authentication apparatus that performs authentication by capturing an image of a palm vein or as a portion of the biometrics authentication apparatus. However, the imaging apparatus 1 may be an imaging apparatus that captures an image of another type of biological information such as finger veins, fingerprints, or pupil irises or may be an imaging apparatus that captures an image of a subject that is not biological information.

Figure 4:
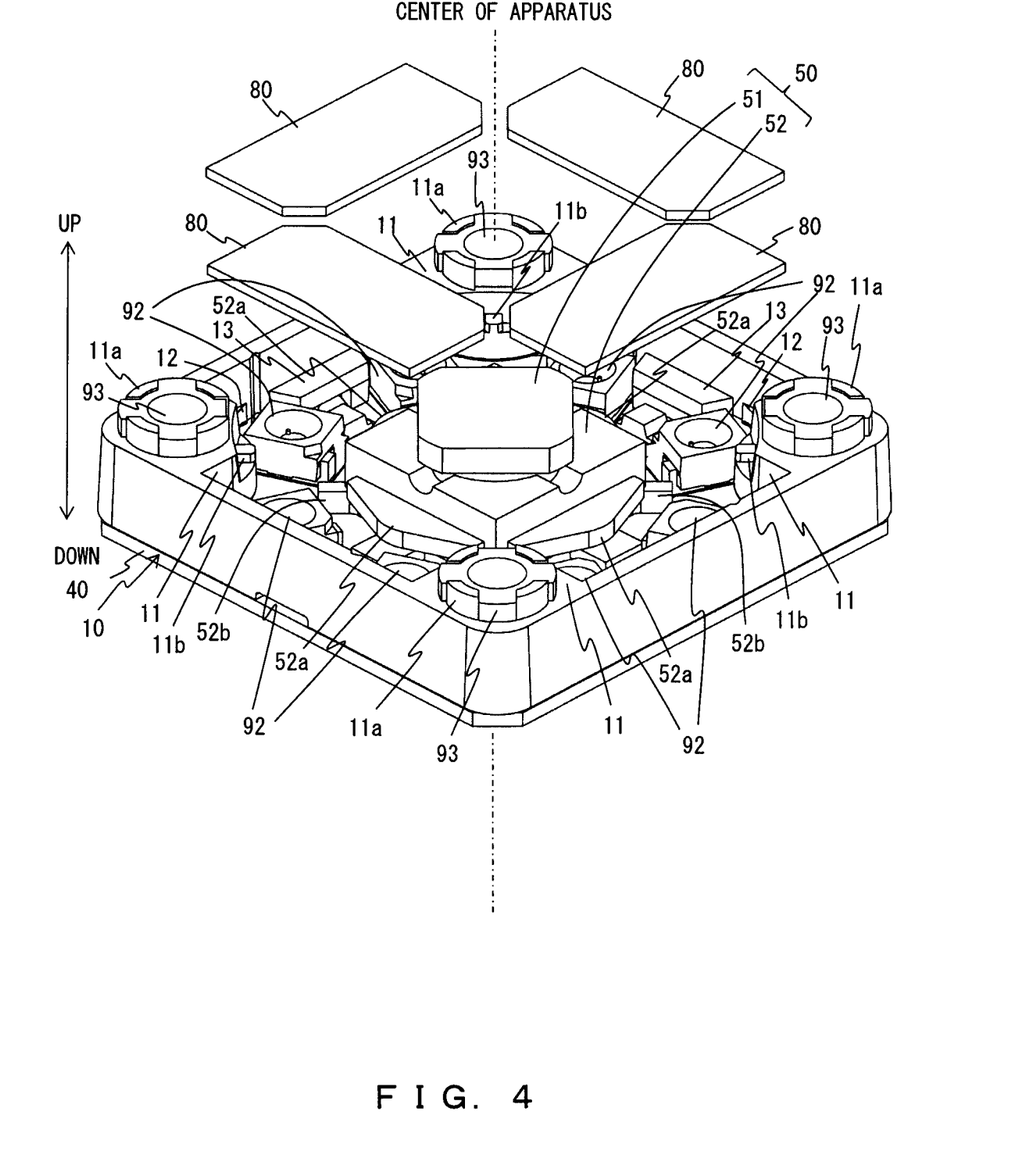
FIG. 4 is a perspective view illustrating a placed state of a polarization member in accordance with an embodiment.
Figure 5:
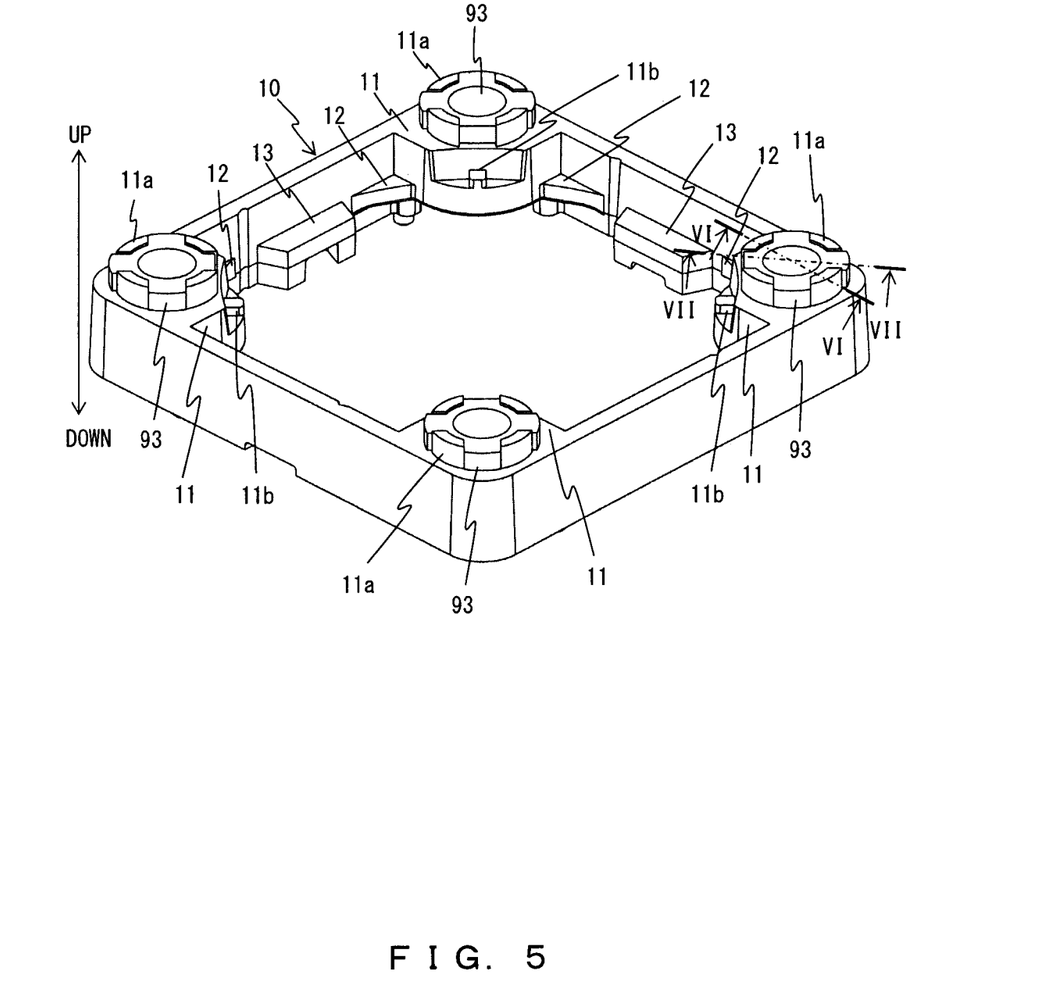
FIG. 5 is a perspective view illustrating an aperture in accordance with an embodiment.

As depicted in FIGS. 2-4, the aperture 10 has a rectangular frame shape (e.g., a rectangular frame shape or a rectangular hollow shape) provided on the outer edge of the wiring board 40 in such a manner as to surround the lens unit 50, the imaging element 91, and the like. As depicted in FIGS. 4 and 5, four swelling parts 11 swelling toward a center on a lens-unit-50 side are provided at four corners of the aperture 10. The four swelling parts 11 each function as an aperture for limiting a range within which light emitted from the ranging lens 93 is diffused, and hence the aperture 10 may be considered to comprise four apertures integral with each other. The four apertures (swelling parts 11) may be separate components.

As depicted in FIGS. 6 and 7, a ranging light emitter (e.g., a LED) 94 is disposed under the swelling part 11. The "under" in the present embodiment refers to a direction opposite to a direction in which light emitted from the ranging light emitter 94 travels (upward direction).

The four swelling parts 11 each include a through hole 11c through which light emitted from the ranging light emitter 94 passes. The through hole 11c includes a large diameter section 11c-1 at an upper portion thereof and a small diameter section 11c-2 having a diameter smaller than that of the large diameter section 11c-1. Both of the diameters of the large diameter section 11c-1 and the small diameter section 11c-2 gradually increase towards the upper side. The through hole 11c having a diameter gradually increasing allows the aperture 10 to diffuse light emitted from the ranging lens 93 with the range of the diffusion limited to a region in which the through hole 11c is provided.

The ranging lens 93 is disposed at a top of the through hole 11c. The ranging lens 93 is located on an optical path of light emitted from the ranging light emitter 94. The through hole 11c is provided at each of the four swelling parts 11: the aperture 10 includes four through holes 11c in total. In accordance with the number of the through holes 11c, four ranging light emitters 94 and four ranging lenses 93 are disposed. Light emitted from the ranging light emitter 94 is reflected from a subject and incident on the imaging element 91.

Figure 8:
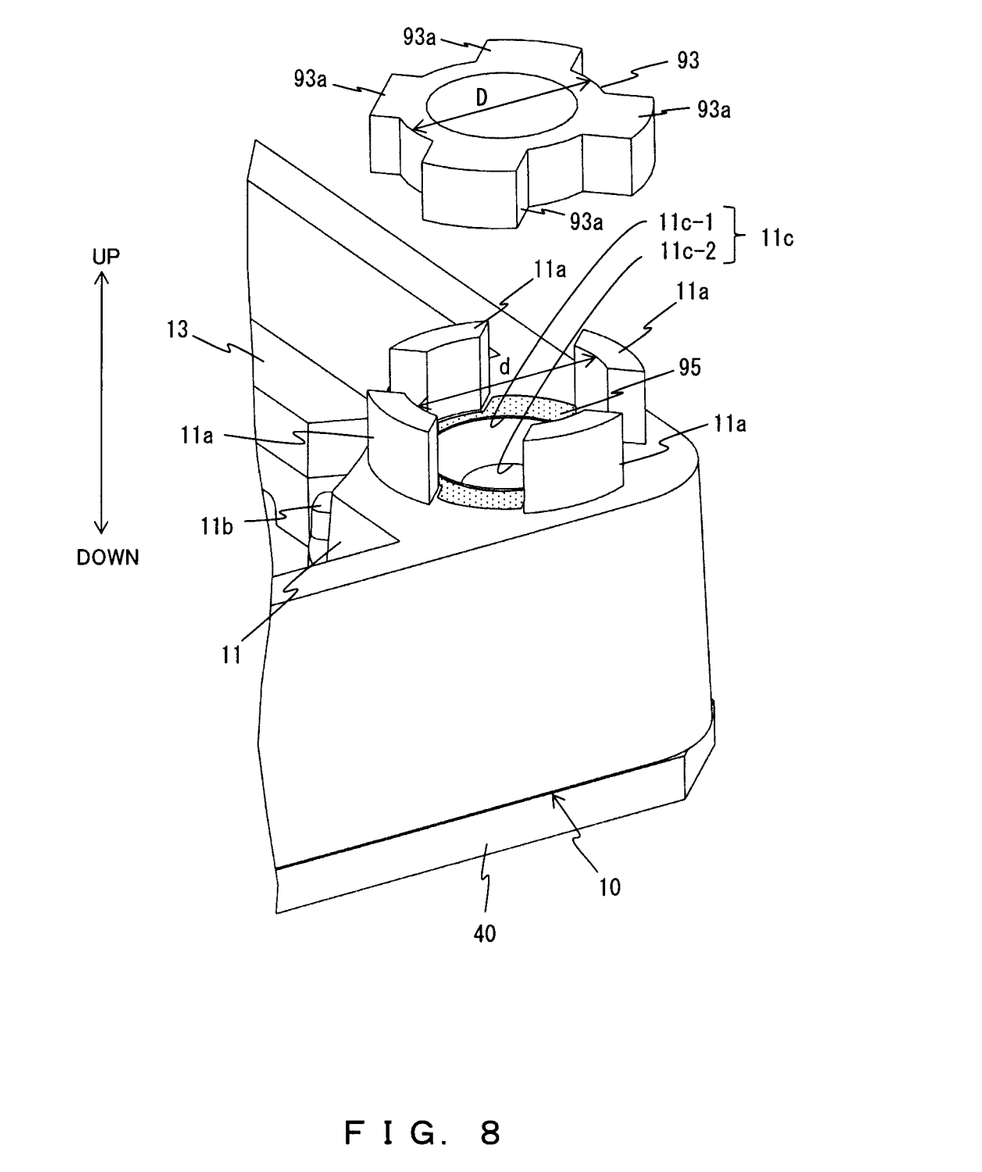
FIG. 8 is an exploded perspective view illustrating a situation in which a ranging lens has been removed from an aperture in accordance with an embodiment.

The swelling part 11 includes four (a plurality of) press-fit convex parts 11a that are formed around the through hole 11c and that project in a direction opposite to the ranging light emitter 94, i.e., project upward. As depicted in FIGS. 5 and 8, the ranging lens 93 is press-fitted into a region surrounded by the four press-fit convex parts 11a.

As depicted in FIG. 8, the ranging lens 93 includes four projections 93a arranged at 90-degree intervals and projecting from a side surface of the ranging lens 93, thereby assuming an X-shape when seen in a plane view. The projection 93a may be provided on the lens body of the ranging lens 93 but is desirably provided at a tubular support member for supporting the side surface of the lens body.

As depicted in FIG. 8, the diameter of the region of the ranging lens 93 excluding the projections 93a, i.e., diameter D, is the same as the diameter of the region surrounded by the four press-fit convex parts 11a, i.e., diameter d. However, the press fitting may be achieved via interference fit with a diameter D that is longer than a diameter d or clearance fit with a diameter D that is shorter than a diameter d. However, in a case were the press fitting is achieved via clearance fit, a desirable clearance is such that no positional misalignments occur between the central axes of the ranging lens 93 and the aperture 10 even when the imaging apparatus 1 is inclined. The diameter d of the region surrounded by the four press-fit convex parts 11a may become longer as the distance to the edge of the press-fit convex part 11a decreases (become longer towards the upper side).

The four press-fit convex parts 11a are each located between two adjacent ones of the four projections 93a (located in spaces arranged in a circumferential direction of the ranging lens 93). The respective numbers of the press-fit convex parts 11a and the projections 93a may be two, three, or five or larger. The projections 93a may be removed.

As depicted in FIGS. 6-8, the double-sided tape 95 is provided between the ranging lens 93 and portions of the top surface of the swelling part 11 that surround the through hole 11c. The ranging lens 93 is not only press-fitted into the region surrounded by the four press-fit convex parts 11a but also adheres to the aperture 10 in such a manner, thereby making the ranging lens 93 unlikely to be separated from the aperture 10. Instead of the double-sided tape 95, another adhering means may be used such as an adhesive.

An engagement convex part 11b that projects upward and that engages an engagement concave part 62 of the light guide body 60 depicted in FIG. 3 is provided at a portion of the swelling part 11 on the lens-unit-50 side (the center side of the apparatus 1).

As depicted in FIG. 5, eight polarization plate supporting parts 12 which are positioned to sandwich the four swelling parts 11 and on which corners of the polarization members 80 are placed are provided on the inner surfaces of the aperture 10. Meanwhile, four polarization plate supporting parts 13 on each of which a central portion of one edge of the polarization member 80 is placed are also provided on inner surfaces at the centers of four edges of the aperture 10 as seen in a plane view.

As depicted in FIGS. 2 and 3, the housing 20 has a rectangular box shape without a top surface. A concave top cover supporting portion 21 at a center side and an upper side on which the outer edge of the top cover 30 is placed is provided at an upper edge of the housing 20.

As depicted in FIG. 3, a plurality of board supporting parts 22 on which the wiring board 40 is placed are provided on the inner surface of the housing 20. The board supporting part 22 includes a supporting convex part 22a having a rectangular solid shape projecting toward the center, and a guide convex part 22b wherein portions of the guide convex part 22b located at a higher position, i.e., portions of the guide convex part 22b more distant from the supporting convex part 22a, have a smaller amount of projection. The guide convex part 22b guides onto the supporting convex part 22a the wiring board 40 inserted into the housing 20 from above together with the aperture 10. A plurality of board supporting parts 22 are provided so that the plurality of guide convex parts 22b can hold the wiring board 40 in a surrounding manner.

As depicted in FIG. 3, the top cover 30 has a rectangular plate shape. The top cover 30 is formed of a translucent material for allow passage of light such as irradiation light emitted from the ranging lens 93 or the illumination light emitter (e.g., a LED) 92 toward a subject (e.g., a palm vein)

or reflection light from the subject. As described above, the top cover 30 is placed on the top cover supporting portion 21 at the outer edge of the housing 20 and supported by the housing 20 at the top cover supporting portion 21.

As depicted in FIG. 2, the imaging element 91, the lens unit 50, the four ranging light emitters 94, and the eight illumination light emitters 92 are mounted on the wiring board 40. Mounting a part such as a central processing unit (CPU) or a memory on the wiring board 40 allows the wiring board 40 to function as a controller for the imaging apparatus 1. When the imaging apparatus 1 is used as a biometrics authentication apparatus, the wiring board 40 may function as a controller for the biometrics authentication apparatus.

As depicted in FIG. 2, the lens unit 50 includes a lens body 51 and a lens supporting member 52 for supporting a lower portion of the lens body 51, wherein the lens unit 50 focuses light on the imaging element 91. The lens body 51 and the lens supporting member 52 each assume a rectangular shape when seen in a plane view as depicted in FIG. 4. The figure indicates one example, and the invention is not limited to this.

As depicted in FIG. 4, the lens supporting member 52 includes four blocking parts 52a and four joined parts 52b.

The four blocking parts 52a are disposed on four side surfaces of the lens supporting member 52 and each project in such a manner as to assume an essentially triangular shape when seen in a plane view. The four blocking parts 52a each project over a region facing two of the eight illumination light emitters 92. Accordingly, the four blocking parts 52a are provided on essentially the entirety of the side surfaces of the lens unit 50. When seen in a plane view, the blocking part 52a may project over a region located around the lens unit 50 and facing the illumination light emitter 92, and, for example, may project above the illumination light emitter 92.

The blocking part 52a blocks stray light from the illumination light emitter 92. In one example, the stray light is reflected from a lower edge of the light shield body 70 depicted in FIG. 2 and then from an upper surface of the wiring board 40 and travels toward the lens body 51.

As depicted in FIG. 2, the four blocking parts 52a each have a corresponding polarization member 80 placed thereon. When the polarization member 80 is omitted from the imaging apparatus 1, another member such as the light shield body 70 may be placed on the blocking part 52a.

As depicted in FIG. 4, the four joined parts 52b project onto the wiring board 40 from portions of the side surfaces of the lens supporting member 52 as seen in a plane view at which the lens body 51 is not provided (e.g., from four corners). The joined part 52b is joined to the wiring board 40 by a joining material such as an adhesive (not illustrated).

The light guide body 60 is toric as depicted in FIG. 3 and guides light emitted from the illumination light emitter 92 depicted in FIG. 2 to a subject through the top cover 30. The light guide body 60 desirably diffuses light emitted from the illumination light emitter 92. The top surface of the light guide body 60 is inclined downward from the inner surface of the body to the outer boundary.

Four rectangular-plate-shaped flange parts 61 projecting in four directions are provided around the light guide body 60. The four flange parts 61 are inserted from above the aperture 10 in such a manner as to face the four inner surfaces of the aperture 10 without interfering with, or being interfered with by, the swelling parts 11 of the aperture 10 and are placed on the polarization members 80. As a result, the light guide body 60 is positioned for four orientations arranged at 90-degree intervals. In a space between every pair of two adjacent flange parts 61 of the light guide body 60, the four engagement concave parts 62 provided around the light guide body 60 each engage the engagement convex part 11b of the swelling part 11, as described above.

The light shield body 70 has a cylindrical shape as depicted in FIG. 3 and is located around the lens body 51 so as to block light as depicted in FIG. 2. A flange part 71 projects from the entirety of the upper edge of the side surface of the light shield body 70. The light shield body 70 is sent to the inside of the light guide body 60 from above, and the flange part 71 is placed on the light guide body 60.

As described above, the four polarization members 80 are each placed on one blocking part 52a of the lens unit 50 and on two polarization plate supporting parts 12 and one polarization plate supporting part 13 of the aperture 10. As a result, as depicted in FIG. 2, the four polarization members 80 are each located on an optical path of light emitted from the illumination light emitter 92, i.e., each located above the illumination light emitter 92.

In the embodiment described above, the imaging apparatus 1 includes ranging light emitters 94 that correspond to exemplary ranging light sources, an aperture 10 that includes through holes 11c through which light emitted from the ranging light emitters 94 passes, and ranging lenses 93 each located on an optical path of light emitted from the ranging light emitters 94. The aperture 10 includes a plurality of (four) press-fit convex parts 11a projecting in a direction opposite to the ranging light emitter 94. The ranging lens 93 is press-fitted into a region surrounded by the plurality of press-fit convex parts 11a.

Press-fitting the ranging lens 93 into a region surrounded by the plurality of press-fit convex parts 11a as described above allows the parts count and the man hours for assembling to be decreased in comparison with the configuration for distance measurement in accordance with the reference technique depicted in FIGS. 9 and 10, i.e., a configuration in which the hole part 196 is inserted into the trough hole 111c in the aperture 111 so that the lugs 111a can be provided. Moreover, since the hole part 196 is not provided, positional misalignments would not occur between the central axes of the ranging lens 93 and the hole part 196 or between the central axes of the hole part 196 and the aperture 10. Accordingly, the present embodiment allows the configuration of the aperture 10 for distance measurement to be simplified. The ranging lens 93 is fixed through press fitting based on the press-fit convex part 11a, not locking based on the lug 111a, thereby allowing the ranging lens 93 to be prevented from shaking or being nicked. The press-fit convex part 11a is less likely to be broken than the lug 111a having a hook.

In the present embodiment, the ranging lens 93 includes a plurality of (four) projections 93a projecting from the side surface of the ranging lens 93, and the plurality of press-fit convex parts 11a are each located between two adjacent ones of the plurality of projections 93a. Accordingly, in comparison with a situation in which the projections 93a are not provided, the ranging lens 93 can be easily and reliably press-fitted.

In the present embodiment, the imaging apparatus 1 further includes an imaging element 91 and a lens unit 50 that focuses light on the imaging element 91. The aperture 10 assumes a frame shape surrounding the imaging element 91 and the lens unit 50 and includes a plurality of the through holes 11c. The imaging apparatus 1 includes as many ranging light emitters 94 and as many ranging lenses 93 as the number of the through holes 11c (4). A single aperture 10 including a plurality of through holes 11c in such a manner allows the parts count and the man hours for assembling to be decreased in comparison with a situation in which a plurality of apertures are disposed. Moreover, positional misalignments may be prevented from occurring between the plurality of through holes 11c.

In the present embodiment, the ranging lens 93 adheres to the aperture 10 owing to an adhering means such as the double-sided tape 95. This allows the ranging lens 93 to be prevented from becoming easily separated from the aperture 10 while simplifying the configuration for distance measurement as described above.

The present invention is not limited to the described embodiments and can be embodied by making changes to the components without departing from the gist of the invention in an implementation phase. Various inventions can be formed by combining, as appropriate, a plurality of components disclosed with reference to an embodiment. For example, all of the components indicated in an embodiment may be combined as appropriate. In this way, various changes or applications are possible without departing from the spirit of the invention.

The invention claimed is:

1. An imaging apparatus comprising:
   four ranging light sources;
   an imaging element;
   a lens unit that focuses light on the imaging element;
   an aperture that assumes a rectangular frame shape surrounding the imaging element and the lens unit and includes four swelling parts swelling toward a center on the lens unit side, the four swelling parts being provided integral at four corners of the aperture; and
   four ranging lens disposed on an optical path of the light emitted from the ranging light source, wherein
   each of the four swelling parts includes a plurality of press-fit convex parts projecting in a direction in which light is emitted from the ranging light source and includes a through hole, through which light emitted from the ranging light source passes, the through hole being integrally provided at the swelling part and having a diameter gradually increasing along a direction in which light emitted from the ranging light source passes,
   each of the four through holes includes a large diameter section and a small diameter section, the large diameter section being positioned on a directional side in which light is emitted from the ranging light source and having a diameter gradually increasing towards the direction, the small diameter section being positioned between the ranging light source and the large diameter section and having a diameter gradually increasing towards the direction,
   the ranging lens is press-fitted into a region surrounded by the plurality of press-fit convex parts,
   the ranging lens includes a plurality of projections projecting from a side surface of the ranging lens,
   the plurality of press-fit convex parts are each located between two adjacent projections of the plurality of projections, and
   a diameter of the region of the ranging lens excluding the projections is the same as or larger than a diameter of the region surrounded by the plurality of press-fit convex parts.

2. The imaging apparatus of claim 1, wherein the ranging lens adheres to the aperture.

* * * * *